United States Patent

Jones et al.

[11] Patent Number: 5,709,272
[45] Date of Patent: Jan. 20, 1998

[54] TURF AERATION DEVICE

[75] Inventors: Jerry Jones, Trenton, Tenn.; Harry Knight, Baton Rouge, La.; Kinsey Estess, Baker, La.; Ernest Randall New, Zachary, La.

[73] Assignee: Southern Green, Inc., Zachary, La.

[21] Appl. No.: 696,534

[22] Filed: Aug. 14, 1996

Related U.S. Application Data

[63] Continuation of Ser. No. 381,728, Feb. 1, 1995, Pat. No. 5,570,746.
[51] Int. Cl.⁶ .................................................. A01B 45/02
[52] U.S. Cl. ............................ 172/21; 172/93; 172/101
[58] Field of Search .............................. 172/21, 22, 93, 172/101, 347

[56] References Cited

U.S. PATENT DOCUMENTS

| | | | |
|---|---|---|---|
| 2,838,986 | 6/1958 | Fessel | 172/21 |
| 3,204,703 | 9/1965 | Hansen | 172/21 |
| 3,878,578 | 4/1975 | Skudrna | |
| 3,959,913 | 6/1976 | Weber. | |
| 4,422,510 | 12/1983 | De Ridder | 172/21 |
| 4,559,035 | 12/1985 | Benjamin. | |
| 4,569,400 | 2/1986 | Minagawa et al. | 172/21 |
| 4,614,239 | 9/1986 | Minagawa et al. | 172/21 |
| 5,207,278 | 5/1993 | Hatlen | 172/21 X |

FOREIGN PATENT DOCUMENTS

| | | | |
|---|---|---|---|
| 225403 | 11/1959 | Australia | 172/21 |
| 4001336 | 7/1991 | Germany | 172/21 |
| 1347967 | 2/1974 | United Kingdom | 172/21 |

*Primary Examiner*—Terry Lee Melius
*Assistant Examiner*—Christopher J. Novosad
*Attorney, Agent, or Firm*—Roy, Kiesel & Tucker

[57] ABSTRACT

A turf aeration device is provided, comprising a wheeled frame having a journalled drive shaft, wherein the frame is attachable to a pulling vehicle having a power take-off capability. Balanced chain and sprocket assemblies are used to transfer power from the power take-off to the drive shaft, and a plurality of aerator mechanisms are attached to the drive shaft and the frame. Each aerator mechanism comprises a link member which supports a pivotable tine holder having at least one tine, a stop member attached to the link member for contacting the tine holder and maintaining a minimum predetermined angle between the tine holder and the link member; a means for adjusting the predetermined angle between the tine holder and the link member; an elastomeric band pivotally connected between the frame and the tine holder for urging the tine holder against the stop member; a drive link attached to the drive shaft; and a connecting rod pivotally attached between the drive link and the link member.

10 Claims, 3 Drawing Sheets

TURF AERATION DEVICE

This is a continuation of application Ser. No. 08/381,728 filed on Feb. 1, 1995, now U.S. Pat. No. 5,570,796.

BACKGROUND OF THE INVENTION

I. Field of the Invention

The present invention relates generally to a device for creating drain channels in the soil, such as in golf courses, athletic fields, parks, and the like, and more particularly to reciprocating mechanisms of this type which minimize damage to the turf surface.

II. Description of Prior Art

In grass fields and other lawn areas which experience sustained vehicular and pedestrian traffic, the turf surface and underlying soil can become undesirably compacted. The problems associated with soil compaction are that rain and fertilizing chemicals are prevented from fully penetrating the gound. The short-term effect of such a condition is that the field will remain soggy for longer periods after a rain, and the long-term effect is the prevention of deep and healthy root system and proper grass growth. Turf aeration is the process of creating channels in the soil so that water, air, and fertilizers can penetrate the gound and be dispersed effectively throughout the soil.

Over the years, many devices have been developed to alleviate soil-compaction problems ranging from pitchforks to heavy, tractor-driven machinery having multiple, reciprocating tines. One such device is shown in the British Patent No. 661,287 issued to Rose (hereinafter "Rose"). That reference discloses a turf aerator mechanism which is enclosed within a housing and which is guided by an operator walking behind the device. The turf aeration mechanism comprises a belt-driven drive link and a connecting rod which act to reciprocate another link member having a pivotable set of tines at one end. A rubber spring is attached on one end to the housing and on its opposite end to the tine support. The rubber spring urges the tines against a stop member which is also attached to the housing. The primary advantage claimed by Rose is that the path of the tines in penetration into and withdrawal from the ground is caused to remain substantially constant, thus minimizing damage to the turf surface.

Another commercial device common in the industry today is the turf aerator manufactured by Verti-Drain® under U.S. Pat. No. 4,422,510 issued to de Ridder (hereinafter "de Ridder"). That device teaches a frame which supports several rotary shafts, drive links, and connecting rods which reciprocate a number of pantograph-type mechanisms. In each mechanism, a tine holder having soil-piercing tines is pivotally attached to an upper link in the mechanism, and a lower link supports a spring device which allows the tines to rotate within the soil to create a drain channel. The device is typically powered by the power take-off drive of the pulling tractor. The chief advantage claimed by that reference is that the turf surface remains largely undisturbed because of the manner in which the path of the tines is substantially vertical during penetration and withdrawal due to the action of the pantograph mechanism.

A number of deficiencies exist, however, in the device disclosed in the de Ridder patent. First, the complexity of the pantograph mechanism in effecting the proper soil penetration and creation of drain channels is largely unnecessary based on Applicant's practical experience. The three factors which most influence successful turf aeration are: (1) the initial angle of penetration of the tines, (2) the pivoting action of the tines while they are in the soil, and (3) the angle of withdrawal of the tines. All three of these factors can still be achieved with a simpler, less expensive device. In particular, it is desirable to have an aeration machine which can match tine length to soil condition. However, changing tine length requires a means for adjusting the resting angle of the tines to insure that the tines penetrate the soft substantially perpendicular to the soil.

Second, the reciprocating mechanisms of the de Ridder device are not dynamically balanced. During operation, the entire machine, as well as the pulling vehicle, are intolerably shaken at higher speeds because of the unbalanced components. This vibration inevitably leads to discomfort to the operator and frequent replacement of expensive machine parts. Moreover, because the speed of operation is relatively slow due to such vibration, the aeration process takes longer and is more expensive to complete. Third, the existing aerator mechanisms are driven by the power take-off drive of the tractor through a single point of attachment to the aerator drive shaft. Smoother operation and use of less bulky parts can be achieved dividing and balancing the drive load on the aerator drive shaft.

With regard to the Rose patent, that device is ill-suited to large scale commercial use, primarily because it is not designed to be pulled behind a tractor and operated through a power take-off drive. Therefore, there is a definite need for a turf aeration device which (1) can be used in commercial groundskeeping environments, (2) can be operated more ,comfortably and at higher speeds through balanced operation, (3) is capable of producing effective drain channels comparable to those of existing machines, (4) is simpler and less expensive to maintain and repair, and (5) can adjust the angle of tine entry into the gound to accommodate various lengths of tines.

SUMMARY OF THE INVENTION

It is therefore an object of this invention to provide a turf aeration device which is simpler and less expensive to operate, maintain and repair than existing aeration devices.

It is also an object of this invention to provide a turf aeration device which is capable of operation at higher speeds than existing aeration devices.

It is a further object of this invention to provide a turf aeration device whose soil-piercing mechanisms are dynamically balanced.

It is a further object of this invention to provide a turf aeration device which can easily adjust the angle of tine penetration into the ground.

Yet another object of this invention is to provide a turf aeration device which can effectively provide turf aeration through the creation of drain channels which cause minimum damage to the turf surface.

These and other objects and advantages of the present invention will no doubt become apparent to those skilled in the art after having read the following description of the preferred embodiment which are contained in and illustrated by the various drawing figures Therefore, in a preferred embodiment, a turf aeration device is provided, comprising a wheeled frame having a journalled drive shaft, wherein said frame is attachable to a pulling vehicle having a power take-off portion; power transfer means, operatively attachable between said drive shaft and said power take-off portion, for transferring power from said power take-off portion to said drive shaft; and a plurality of aerator mechanisms operatively attached to said drive shaft and said frame. Each said aerator mechanism comprises a link member, having a base and a distal end, wherein said base is pivotally attached to said frame; a tine holder, having at least one tine, pivotally attached to said distal end of said link member; stop means attached to said link member for contacting said tine holder; adjustment mechanism for maintaining a minimum predetermined angle between said holder and said link member; resilient means pivotally connected between said frame and said the holder for urging said tine holder against said stop means; a drive link fixedly attached to said drive shaft; and a connecting rod pivotally attached between said drive link and said link member.

DETAILED DESCRIPTION OF THE PREFERRED EMBODIMENT

Figure 1:
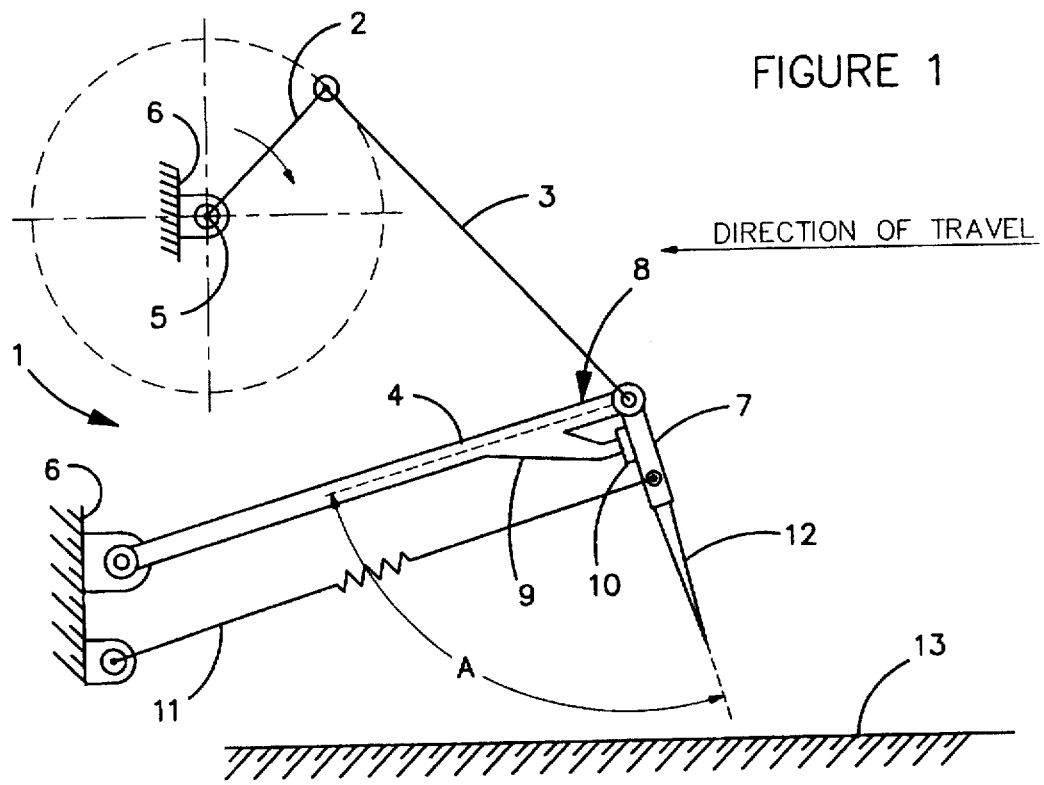
FIG. 1 is a schematic elevation view of the soil-piercing mechanism of the present invention depicting the tines in a position roughly halfway through its reciprocating arc.

In the drawings many details pertaining to fabrication and maintenance utility well established in the machine construction art and not bearing upon points of novelty are omitted in the interest of descriptive clarity and efficiency. Such details may include threaded connections, lockrings, shear pins, weld lines and the like. The spreading use of electron beam welding eliminates many such features and leaves no visible distinctive lines. Unless otherwise specified, all parts are constructed of steel or of some other material suited to performing substantially the same function described herein.

Turning now to FIG. 1, an aeration mechanism 1 is shown in mid-stroke generally comprising drive link 2 and connecting rod 3 which impart a reciprocating motion to link member 4. Drive link 2 is attached at its base to drive shaft 5 shown more clearly in FIG. 3, while drive shaft 5 is journalled between two points on the frame 6 of the invention. Link member 4 is pivotable about a fixed point on frame 6, with tine holder 7 being pivotally suspended from the distal end 8 of link member 4. Stop member 9 acts as a rest position for tine holder 7 and is either made as a pan of link member 4 or, as shown in FIG. 4, is connected to link member 4. Preferably, stop member 9 includes a shock-absorbing tip 10 of rubber or other suitable material to contact tine holder 7.

Resilient member 11 is pivotally attached between a fixed point on frame 6 and a point on tine holder 7 to bias tine holder 7 against stop member 9 before and after drain channels are formed in the soil 13. Alternatively, resilient member 11 may also be attached to point on link member 4, because all that is required of resilient member 11 is that it urge tine holder 7 against stop member 9. It is not intended to withstand any compressive forces, because stop member 9 prevents the rest position angle A between link member 4 and tine holder 7 from decreasing. Resilient member 11 may simply comprise at least one spring device or at least one elastomeric band, such as a bunge cord. Preferably, resilient member 11 should be easily removable from tine holder 7 and frame 6, such as by clips or hooks, to facilitate maintenance of the invention. A means for adjusting the tension of the resilient members may also be included. Shown in FIG. 4 is link member 4 having a series of link openings 40 at which resilient member 11 may be attached. Tines 12 are removably attached to tine holder 7 in a manner well known to those in the art.

Figure 2:
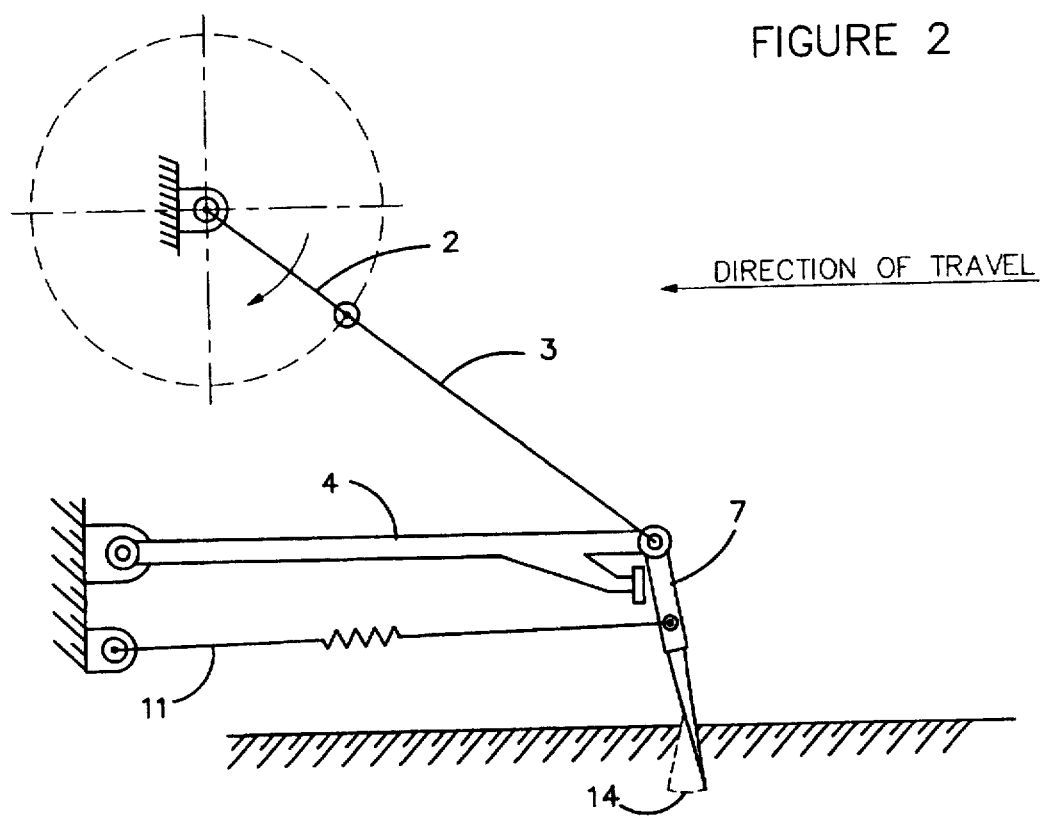
FIG. 2 is a schematic elevation view of the soil-piercing mechanism of the present invention depicting the tines penetrating the soil and pivoting to create a drain channel.

FIG. 2 shows the aeration mechanism 1 in a soil-piercing position. Drive link 2 and connecting rod 3 are in alignment to place link member 4 in its farthest position, forcing tine 12 to penetrate the soil 13. As the aeration mechanism 1 travels forward, tine 12 temporarily remains in the soil 13 and is allowed to pivot therein just prior to being withdrawn by the cyclic action of drive link 2 and connecting rod 3. The pivoting effect of tine 12 creates a drain channel 14, or pocket, in the soil 13 beneath the turf surface. The withdrawal of tine 12 along a path substantially the same as the path taken at penetration assures that minimal damage to the turf surface is done. As stated earlier, this goal is accomplished without the need for more complicated mechanisms, such as the pantograph seen in the de Ridder patent. As tine 12 leaves the soil 13, resilient member 11 pulls tine holder 7 to a rest position against stop member 9, and the aeration mechanism 1 begins another cycle.

Figure 3:
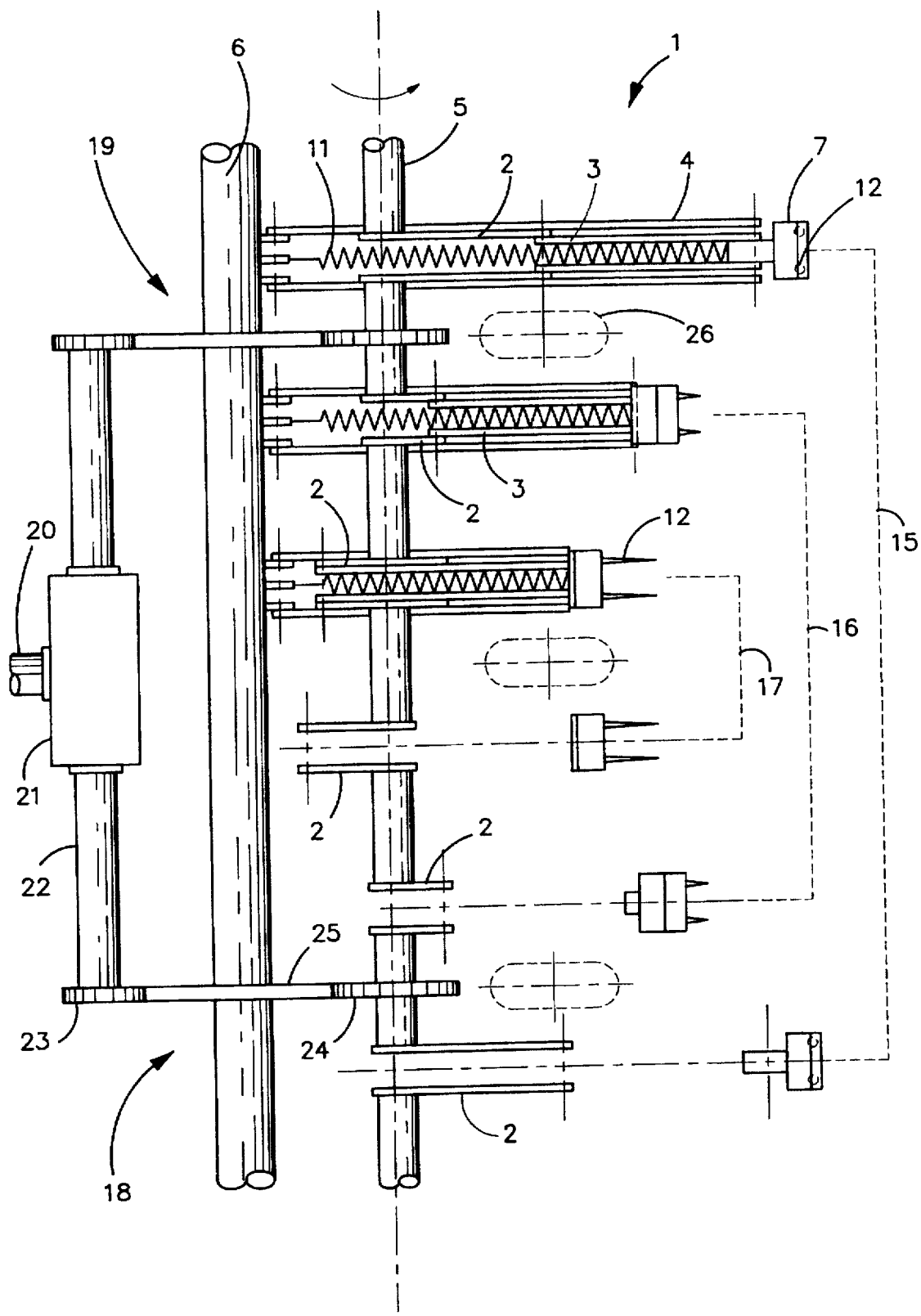
FIG. 3 is a schematic plan view of an embodiment of the present invention depicting the balanced raisins and the division of the drive load on the aeration drive shaft.
Figure 4:
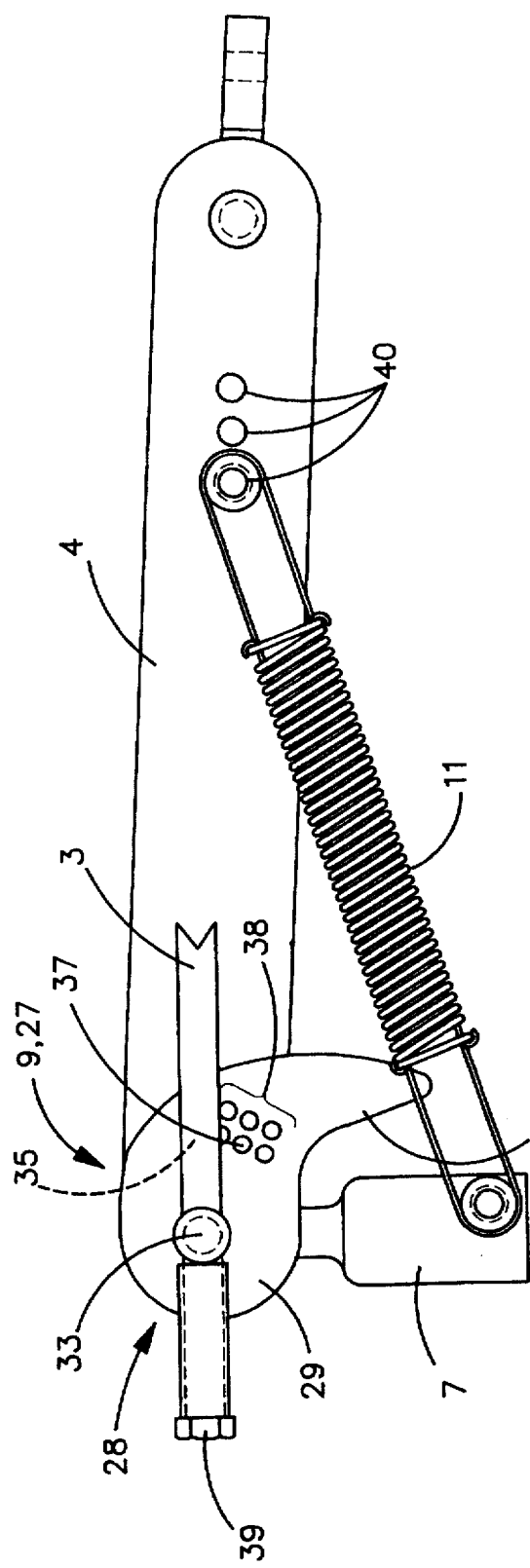
FIG. 4 is a side elevation of an embodiment of the stop member of the present invention.

FIG. 3 is a schematic plan view of an assembled turf aeration device incorporating six (6) aeration mechanisms 1 operatively attached to frame 6 and drive shaft 5 at equal distances from one another. The upper half of FIG. 3 shows the individual components in detail, while the lower half of FIG. 3 shows only tine holder 7 and drive link 2. In a preferred embodiment, the assembled device comprises an outer pair 15 of mechanisms which includes the outermost aeration mechanisms 1, an intermediate pair 16 which includes the two aeration mechanisms 1 just inside the outer pair 15, and an inner pair 17 which includes the innermost aeration mechanisms 1.

Although not necessarily to scale, FIG. 3 depicts the aeration mechanisms 1 as being dynamically balanced on drive shaft 5. In such a configuration, the drive links 2 of outer pair 15 are aligned so that the mechanisms 1 will reciprocate together and penetrate the soil 13 at the same time and to the same extent. Likewise, the drive links 2 of intermediate pair 16 are similarly aligned with respect to one another so that its constituent mechanisms 1 will act together. Finally, the drive links 2 of inner pair 17 are aligned to perform similarly to outer and intermediate pairs 15,16. The drive link of each pair 15,16,17 are positioned about drive shaft 5 in a manner which causes penetration of the soft 13 by each successive pair 15,16,17 of aeration mechanisms 1, preferably equiangularly spaced in 120° increments to assure uniform aeration. If more or less than six mechanisms 1 are employed, this angle can be adjusted to suit the needs of the situation.

In a preferred embodiment, gear box 21 having primary shaft 22 is attached to a frame 6, and a pair of chain and sprocket assemblies 18,19 are used to transfer power from the tractor's power take off drive 20. Frame 6 will typically be supported on inflatable wheels 26. Primary shaft sprockets 23 are attached to each end of primary shaft 22, while two drive shaft sprockets 24 are attached to drive shaft 5 between outer pair 15 and intermediate pair 16 as shown in FIG. 3. Chains 25 are operatively connected between sprockets 23,24 of each chain and sprocket assembly 18,19.

Although the advantage of balancing the torquing force on drive shaft 5 in this manner appears to be subtle, the long term result is that the extent of vibration and twisting of drive shaft 5 is greatly reduced. This feature serves to enhance the stability of the overall device, thus contributing to the longer life of the present aerator. Of course, increasing the number of torquing points along drive shaft 5 to more than just two locations may increase these benefits, but may also undesirably add more weight and complexity to the aerator.

The many advantages of this balanced design are that: (1) the proper formation of the drain channels is maintained, ensuring the quality of the aeration, (2) the present invention does not vibrate and rock as much as existing aeration devices, (3) wear and tear on moving parts is dramatically decreased, thus saving time and money in expensive repairs, and (4) the invention can be operated at much higher speeds than other aerators, allowing operators to perform jobs more efficiently.

Figure 5:
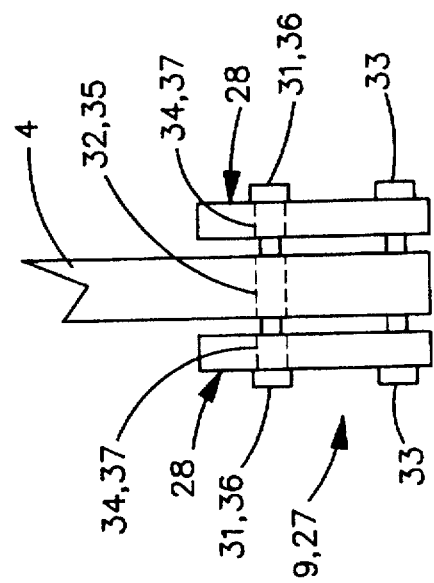
FIG. 5 is a top elevation schematic plan view of an embodiment of the stop member of the present invention.

The invention may also have an adjustable stop member 9, as shown in FIG. 4 and FIG. 5, to allow adjustment of rest position angle A (shown in FIG. 1) between link member 4 and tine holder 7. In this instance, link member 4 has a connection member 31 and a first connection engagement means 32. Connection member 31 can be a pin, bolt 36, latch, or other device capable of being connected to link member 4 at first connection engagement means 32. First connection engagement means 32 may be a first opening 35 in the link member 4, a depression in link member 4, or other structure on link member 4 capable of engaging and holding connecting member 31. Stop member 9 has a tine angle adjustment mechanism 27 having at least one rigid body 28 with a first end 29 pivotally attached to the distal end 8 of link member 4 at pivot point 33 and a second end 30 for contacting the tine holder 7. Interposed between first end 29 and second end 30 is at least one second connection engagement means 34. Second connection engagement means 34 may be a second opening 37 in rigid body 28, a depression in rigid body 28, or other structure on rigid body 28 capable of engaging and holding connecting member 31. Second connection engagement means 34 is placed on rigid body 28 in order to align with first connection engagement means 32 on the link member 4 as rigid body 28 is pivoted about pivot point 33. Once aligned, the rigid body 28 and link member 4 can be fixed to one another by use of connection member 31 placed between first connection engagement means 32 and second connection engagement means 34.

In the embodiment shown in FIG. 4 and FIG. 5, tine adjustment mechanism 27 has two rigid bodies 28 placed on opposing sides of link member 4. First connection engagement means 32 is a rust opening 35 through link member 4. Second connection engagement means 34 is a plurality of second openings 37 on each rigid body 28. Second openings 37 on each rigid bodies 28 are positioned in at least one row 38, each row 38 being placed in a circular are centered on the pivot points 33 of the rigid bodies 28. Shown in FIG. 4 are two rows 38 of second openings 37. For each row 38 of second openings 37, a corresponding first opening 35 is provided through link member 4 to allow alignment of rust opening 35 with the second openings 37 on each rigid body 28 as tine adjustment mechanism 27 is pivoted. A bolt 36 is placed through the aligned rust opening 35 on link member 4 and second openings 37 on rigid bodies 28 thereby fixing the position of the tine adjustment mechanism 27 with respect to link member 4. Each position of alignment of first opening 35 with second opening 37 corresponds to a different angle at which a tine 12 of fixed length enters the ground. Thus, for each position of alignment of first openings 35 with second openings 37, one particular tine length can be chosen to insure that the tine 12 enters the ground in a substantially vertical manner. If freer adjustment of the angle of tine 12 penetration into the ground is desired, additional rows 38 of second openings 37 can be provided on rigid body 28 with the corresponding first opening 35 provided on link member 4. This embodiment of tine adjustment mechanism 27 is easily accessible, providing an simple task to change the tine rest position angle A. Further, the position of the second openings 37 on rigid body 28 can be made to correspond, on a one-to-one basis, with a standard set of tine lengths, thereby eliminating any operator guesswork on the proper choice of tine rest position angle A with tine length.

FIG. 4 also shows rotational stop 39. Rotational stop 39 attaches near and projects outwardly from the connecting rod 3 in order to contact tine holder 7 whenever tine holder 7 rotates upwardly and rearwardly away from the direction of travel. If the tines 12, upon penetration into the soil, contact a non-resilient layer or object, such as a stone, the tines 12 can rapidly rebound from the object and refract from the soil causing the tine holder 7 to rotate upwardly away from the direction of travel. An unrestrained upward rotation could cause damage to the resilient member 11, connecting rod 3, drive link 2 or the tines 12. Rotational stop 39 restrains the upward rotation of the tine holder 12 away from the direction of travel. Alternatively, rotational stop 39 could be attached to the distal end 8 of link member 4 or to the first end 29 of the rigid body 28, the attachment point not being critical provided rotational stop 39 is place on the aerator mechanism 1 to restrain the upward and rearward rotation of tine holder 7.

Although the present invention has been described in terms of specific embodiments, it is anticipated that alterations and modifications thereof will no doubt become apparent to those skilled in the art. For example, it will be understood that more or less aeration mechanisms may be employed in an assembled device, depending on the needs of the operator, without sacrificing any of the features described herein. It is therefore intended that the following claims be interpreted as coveting all such alterations and modifications as fall within the true spirit and scope of the invention.

I claim:

1. A turf aeration device, comprising:
   (a) a wheeled frame having a journalled drive shaft, wherein said frame is attachable to a pulling vehicle having a power take-off portion;
   (b) power transfer means, operatively attachable between said drive shaft and said power take-off portion, for transferring power from said power take-off portion to said drive shaft;
   (c) a plurality of aerator mechanisms operatively attached to said drive shaft and said frame, each said aerator mechanism comprising:
      a link member, having a base end and a distal end, wherein said base end is pivotally attached to said frame;
      a tine holder, having at least one tine, pivotally attached to said distal end of said link member;
      stop member attached to said link member for contacting said tine holder and maintaining a minimum predetermined angle between said tine holder and said link member;
      resilient means pivotally connected between said frame and said tine holder for urging said tine holder against said stop member;

a drive link fixedly attached to said drive shaft; and a connecting rod pivotally attached between said drive link and said link member;

and wherein said power transfer means comprises:

gear means operatively connected to said power take-off portion and having a primary shaft therethrough, parallel with said drive shaft, for transferring power from said power take-off portion to said primary shaft;

a plurality of primary shaft sprockets attached to said primary shaft;

a plurality of drive shaft sprockets, equal in number to said plurality of primary shaft sprockets, attached to said drive shaft and substantially aligned with said primary shaft sprockets; and a plurality of chains, equal in number to said plurality of primary shaft sprockets, operatively connected between said primary shaft sprockets and said drive shaft sprockets.

2. A turf aeration device according to claim 1 wherein said stop member further comprises a tine adjustment mechanism to adjust said minimum predetermined angle between said tine holder and said link member.

3. A turf aeration device according to claim 1, wherein the number of said aerator mechanisms is an even number.

4. A turf aeration device according to claim 1, wherein said aerator mechanisms are equally spaced from one another along said drive shaft.

5. A turf aeration device according to claim 1, wherein the number of said primary shaft sprockets, said drive shaft sprockets and said chains is two, and wherein said drive shaft sprockets are attached to said drive shaft inside an outermost pair of said aerator.

6. A turf aeration device, comprising:

(a) a wheeled frame having a journalled drive shaft, wherein said frame is attachable to a pulling vehicle having a power take-off portion;

(b) power transfer means, operatively attachable between said drive shaft and said power take-off portion, for transferring power from said power take-off portion to said drive shaft;

(c) a plurality of aerator mechanisms operatively attached to said drive shaft and said frame, each said aerator mechanism comprising:

a link member, having a base end and a distal end, wherein said base end is pivotally attached to said frame;

a tine holder, having at least one tine, pivotally attached to said distal end of said link member;

stop member attached to said link member for contacting said tine holder and maintaining a minimum predetermined angle between said tine holder and said link member;

resilient means pivotally connected between said link member and said tine holder for urging said tine holder against said stop member;

a drive link fixedly attached to said drive shaft; and a connecting rod pivotally attached between said drive link and said link member; and wherein said power transfer means comprises:

gear means operatively connected to said power take-off portion and having a primary shaft therethrough, parallel with said drive shaft, for transferring power from said power take-off portion to said primary shaft;

a plurality of primary shaft sprockets attached to said primary shaft;

a plurality of drive shaft sprockets, equal in number to said plurality of primary shaft sprockets, attached to said drive shaft and substantially aligned with said primary shaft sprockets; and a plurality of chains, equal in number to said plurality of primary shaft sprockets, operatively connected between said primary shaft sprockets and said drive shaft sprockets.

7. A turf aeration device according to claim 6 wherein said stop member further comprises a tine adjustment mechanism to adjust said minimum predetermined angle between said tine holder and said link member.

8. A turf aeration device according to claim 6, wherein the number of aerator mechanisms is an even number.

9. A turf aeration device according to claim 6, wherein said aerator mechanisms are equally spaced from one another along said drive shaft.

10. A turf aeration device according to claim 6, wherein the number of said primary shaft sprockets, said drive shaft sprockets and said chains is two, and wherein said drive shaft sprockets are attached to said drive shaft inside an outermost pair of said aerator mechanisms.

* * * * *

UNITED STATES PATENT AND TRADEMARK OFFICE
CERTIFICATE OF CORRECTION

PATENT NO. : 5,709,272
DATED : January 20, 1998
INVENTOR(S) : Jones, et al

It is certified that error appears in the above-identified patent and that said Letters Patent is hereby corrected as shown below:

On The Title Page under item [63], Related U.S. Application Data, after "5,570,746" insert -- which was a continuation-in-part of application 08/031,581 filed March 15, 1993, now abandoned--

In The Specification, column 1, line 3, after "5,570,746" insert -- which was a continuation-in-part of application 08/031,581 filed March 15, 1993, now abandoned--

Signed and Sealed this

Twenty-eighth Day of April, 1998

Attest:

BRUCE LEHMAN

*Attesting Officer*      *Commissioner of Patents and Trademarks*